United States Patent
Parisot

(10) Patent No.: US 8,966,518 B2
(45) Date of Patent: Feb. 24, 2015

(54) METHOD FOR VALIDATING ACCESS TO A PRODUCT BY MEANS OF A SECURITY MODULE

(75) Inventor: Laurence Parisot, Velizy (FR)

(73) Assignee: Nagravision S.A., Cheseaux-sur-Lausanne (CH)

( * ) Notice: Subject to any disclaimer, the term of this patent is extended or adjusted under 35 U.S.C. 154(b) by 1509 days.

(21) Appl. No.: 12/282,655

(22) PCT Filed: Mar. 13, 2007

(86) PCT No.: PCT/EP2007/052319
§ 371 (c)(1),
(2), (4) Date: Jun. 24, 2009

(87) PCT Pub. No.: WO2007/104749
PCT Pub. Date: Sep. 20, 2007

(65) Prior Publication Data
US 2010/0011387 A1    Jan. 14, 2010

(30) Foreign Application Priority Data
Mar. 13, 2006 (EP) .................................. 06290423

(51) Int. Cl.
*H04N 7/16* (2011.01)
*H04N 7/167* (2011.01)
(Continued)

(52) U.S. Cl.
CPC ......... *H04N 7/1675* (2013.01); *H04N 7/17318* (2013.01); *H04N 21/2347* (2013.01);
(Continued)

(58) Field of Classification Search
USPC ...................................... 725/25, 27; 380/231
See application file for complete search history.

(56) References Cited

U.S. PATENT DOCUMENTS

| 6,810,525 B1 * | 10/2004 | Safadi et al. ........................ 725/1 |
| 6,983,480 B1 * | 1/2006 | Sie et al. .......................... 725/25 |

(Continued)

FOREIGN PATENT DOCUMENTS

| EP | 1398966 A1 | 3/2004 |
| WO | 03/085959 A1 | 10/2003 |

OTHER PUBLICATIONS

International Search Report issued in PCT/EP2007/052319 dated Apr. 2, 2008.

(Continued)

*Primary Examiner* — Nasser Goodarzi
*Assistant Examiner* — Michael Hong
(74) *Attorney, Agent, or Firm* — DLA Piper LLP US

(57) ABSTRACT

A method for validating access to a product by a security module associated with a user unit unidirectionally connected to a managing center MC transmitting management messages being generated following the receipt of a request for an access right to the product, said method comprises the steps of purchasing a product, determining a code representing the product, displaying said code on a display device, transmitting to the MC, a request comprising said code and an security module identifier, transmitting a right confirmation message addressed to the user unit associated with said security module, wherein, at purchasing of the product, a temporary right is registered in the security module, said temporary right being replaced by a definitive right by the right confirmation message received from the MC, said definitive right authorizing the access to the purchased product by debiting the value amount associated with said product.

14 Claims, 1 Drawing Sheet

(51) Int. Cl.
*H04N 7/173* (2011.01)
*H04N 21/2347* (2011.01)
*H04N 21/266* (2011.01)
*H04N 21/418* (2011.01)
*H04N 21/4623* (2011.01)
*H04N 21/472* (2011.01)
*H04N 21/475* (2011.01)
*H04N 21/8355* (2011.01)

(52) U.S. Cl.
CPC ..... *H04N21/26606* (2013.01); *H04N 21/4181* (2013.01); *H04N 21/4623* (2013.01); *H04N 21/47211* (2013.01); *H04N 21/4753* (2013.01); *H04N 21/8355* (2013.01)
USPC ............................................. 725/25; 380/231

(56) References Cited

U.S. PATENT DOCUMENTS

2004/0049777 A1* 3/2004 Sullivan ............................ 725/5
2004/0068541 A1   4/2004 Bayassi et al.
2006/0015580 A1* 1/2006 Gabriel et al. ................ 709/219

OTHER PUBLICATIONS

Stow, et al., "Eurocrypt—a versatile conditional access system for MAC broadcasts", IEEE, pp. 278-279 XP010085489, Jun. 6, 1989.
"Functional Model of a Conditional Access System", EBU Review—Technical, European Broadcasting Union, Brussels, BE, No. 266, pp. 64-67, XP000559450, Dec. 21, 1995.

* cited by examiner

METHOD FOR VALIDATING ACCESS TO A PRODUCT BY MEANS OF A SECURITY MODULE

The present invention relates to the domain of the digital pay-TV where users purchase consumption rights on products, which are broadcasted against payment. The latter is debited from a credit stored in a security module associated with a user unit or decoder.

TECHNICAL BACKGROUND

The role of a security module is to control the access to a stream transporting the encrypted digital data made available for users by a broadcasting server. For example, in the Pay-TV domain, a decoder allows to access and to decipher the broadcasted encrypted audio/video data stream according to rights registered in the security module associated with said decoder.

Generally, a security module is defined as a protected electronic module considered to be tamper-proof as for example a removable microprocessor card inserted in an appropriate reader, which connects the module to the decoder.

This security module, provided with communication interfaces, receives from a managing center messages intended for the management of access rights to broadcasted data. These messages are called management or administration messages EMM (Entitlement Management Message).

The document WO03/085959 describes a system comprising a managing center transmitting a data stream encrypted by control words included in control messages (ECM). The data stream is addressed to at least one user unit connected to a security module identified by a unique address. This module contains a credit, which is decremented on the basis of the purchase of products or on the consumption of the data stream. To reload the credit, the user communicates to the managing center an identifier representative of the unique address of the security module and a value code representing the reload amount. The managing center processes and verifies the value code before transmitting to the security module an encrypted management message (EMM) allowing the credit to be reloaded.

When the credit is sufficient in the security module two modes of purchasing are possible, namely:
  local purchasing: the user decides to use all or part of his/her credit for buying a product. Thus, a new right is created in the security module for reception of said product after decrementation of the credit.
  purchasing via the managing center: the user calls the managing center for buying a product. The managing center sends then an encrypted management message (EMM) containing the access right to said product as well as the amount to be decremented from the credit of the security module.

In both cases, the purchase is carried out through the processing of messages containing a right for a product as well as the corresponding cost. If the available credit is sufficient, the security module processes the message i.e. the credit is decremented and the right is validated. The right thus authorizes the access to a broadcasted product at reception.

If the credit stored in the security module is insufficient, the received EMM management message is rejected and the access to the requested product is impossible. The same effect can also occur when the user unit is out of service and thus unable to validate the required right. Thereby the access control system and the managing center do not have any information about the real use of the credit, which represents a drawback when deductions for the products suppliers have to be established.

Since the user units have no direct feedback channel towards the access control system, the effective consumption rate of the products with regards to the sent messages cannot be determined. In fact, the quantity of transmitted messages being larger than the quantity of messages actually locally processed to release access to products, the managing center may pay to suppliers some surplus of rights and/or of products, which have never been consumed, nor paid by the users.

At the time of a purchase via the managing center, the user transmits a request comprising a security module identifier and a code related to the product or to the selected service. When this transmission is made via a feedback channel independent from the reception channel of the broadcasted data, such as sending the request by telephone or by a short message (SMS), a verification of the correspondence of the security module identifier with the effective user cannot be carried out. In fact, it would be possible to generate some services and products codes with security modules identifiers, with adequate software for example, and to transmit them to the managing center. The latter analyses these requests, accepts the ones whose security module identifier is known by the database of the center for broadcasting management messages EMM addressed to units relating to the recognized security module identifiers. At the time of the receipt of these EMM messages, the security modules corresponding to the identifiers of the recognized modules will have their credits debited unbeknown of the users of the concerned units. An error on entering the code on behalf of the user can also lead to the transmission of an EMM message resulting on an inopportune debit of a credit of another user's unit. The probability of such a debit increases proportionately to the number of units in service in the network.

The document U.S. Pat. No. 6,810,525 describes a method and a system for impulse purchase of services via a communication network. A service purchase request is transmitted by a subscriber terminal to an access control center, which generates an encrypted message including a service identifier and associated rights. The terminal receives this message together with the cost of the selected service and verifies if the available credit is sufficient. In case of success of the verification, a secure token is generated by an application of the terminal. This token is sent to a server of the network to determine the state of the rights of the subscriber before processing the purchase request by the access control center. This service purchase system is applied to a bidirectional network configuration in which the subscriber terminals are permanently connected to the access control center and to the server verifying the tokens. This system constitutes a solution to the problem of undesirable debits from other users as it uses a point-to-point transmission of the verification tokens using preferably a feedback channel depending on the terminal. However, the method cannot be easily executed automatically in a broadcasting system having a feedback channel independent from the terminal used for the sending of the requests only. A manual execution would imply the transmission by the user of two messages: the purchase request and the token generated by the terminal. This method would become uncomfortable and fastidious for a fast and impulsive purchase of services available on-line.

The document EP1398966 describes a system for a transaction carried out by a user of a receiver without feedback channel. The system comprises a broadcast center (headend), a communication network and a receiver provided with a display suitable for receiving the digital data transmitted by the broadcast center via the communication network. The receiver comprises a security module configured in order to display a first unique code identifying the module; this code enables the creation of a transaction token. A second code identifying a service or a product to be ordered is also displayed, this code being included in the data of the broadcasted product. At the time of the purchase, the user selects a product and transmits its identification code and price together with the unique code of the security module (transaction token) to the broadcasting center. This transmission is carried out through a channel independent from the receiver such as the voice telephone, a short message (SMS) or something else. The broadcasting center decodes the token and releases the product after recognition on a database of the security module identifier extracted from the token.

This system is subject to the problem of undesirable debits from other users by transmission of identification codes being able to be recognized by the broadcasting center and corresponding to some security modules in service. Since it handles on a data transmission in broadcast mode, the managing messages allowing the viewing of the products and the debit of a credit on a given receiver are broadcasted towards all the receivers of the network. The encryption of the tokens mentioned in the document EP1398966 can be a solution to this problem. However, encryption keys and identifiers of security modules can be determined by malicious third parties, which can thus systematically generate tokens to cause debits in more or less large number of receivers.

SUMMARY OF THE INVENTION

The present invention aims to prevent the above-mentioned drawbacks, by allowing the managing center to ensure an improved control of the rights provided to the users by means of the management messages. In fact, the managing center transmits the messages only when the credit stored in the security module of the user unit is sufficient.

Another aim is to provide a shield against the inappropriate debits of the credits resulting from transmissions of dummy requests containing identifiers of security modules recognized by the managing center.

This aim is reached by a method for validating access to a product by a security module associated with a user unit unidirectionally connected to an access control system transmitting management messages addressed to said security module, said messages being generated by the access control system further to the receipt of a request for an access right to a product consisting in broadcasted digital data, said method comprising the following steps:
  purchasing a product proposed by the user unit and verification by the security module that a value amount associated with the product is covered by the remaining credit,
  in the affirmative, determining a code representing the purchased product,
  displaying said code on a display device connected to the user unit,
  transmitting to the managing center, via a channel independent from the user unit, a request comprising at least said code and an identifier representing the identifier of the security module,
  verifying by the access control system the validity of the code and the identifier of the security module,
  transmitting a right confirmation message addressed to the user unit associated with said security module,
the method is characterized in that, at purchasing of the product, a temporary right is registered in the security module when the remaining credit is equal or higher than the value amount associated with said product, said temporary right being replaced by a definitive right by the right confirmation message received from the managing center, said definitive right authorizing the access to the purchased product by debiting the value amount associated with said product.

The solution consists in proving at the access control system that the security module is actually suitable for creating a right for purchasing a selected product. At purchasing of the product, the value amount associated with said product is compared with the credit that remains in the security module. When the remaining credit is equal or higher than the value amount associated with the product, a temporary right is stored in the security module. A code identifying this right specific to the product is associated with the unique number identifying the security module and is then transmitted to the managing center in the form of a right request. At the receipt of the request, the access control system generates a right confirmation message, which comprises the definitive right and the identifying code as the condition for accessing to the definitive right. The security module receives this confirmation message and replaces the temporary right with the definitive right of the message only if the identifying code corresponds to the temporary right. The access to the product is thus authorized. Otherwise, in the case of a different definitive right identifier or not comprised in the temporary rights, the management message is rejected and the access to the product is refused for lack of a valid right.

The advantage of this method is that the confirmation message is generated and transmitted by the access control system only if the verification of the credit of the security module has been carried out successfully. In other words, if the initial credit is insufficient in comparison with that required by the product, a request to the managing center cannot be generated.

Generally, the managing center and the access control system are two separated entities. The first entity consists in an interface with the user managing the rights requests, while the second entity generates the management messages for user units according to the requests received from the first entity. In certain configurations this two entities can be grouped together in a global management system.

This method solves the problem of undesirable debits made by other users because the right to definitive access on the purchased product is granted only to the unit which security module contains the temporary right corresponding to the selected product. The units not having this right or another right corresponding to a different security module and/or product will not be affected by the right confirmation message. Thus, the necessary supplementary condition for a credit to be definitively debited is the presence of the temporary right corresponding to a product and to a given security module.

BRIEF DESCRIPTION OF THE DRAWINGS

The invention will be better understood thanks to the following detailed description, which refers to the enclosed drawings given as non-limitative examples.

DETAILED DESCRIPTION OF THE INVENTION

Figure 1:
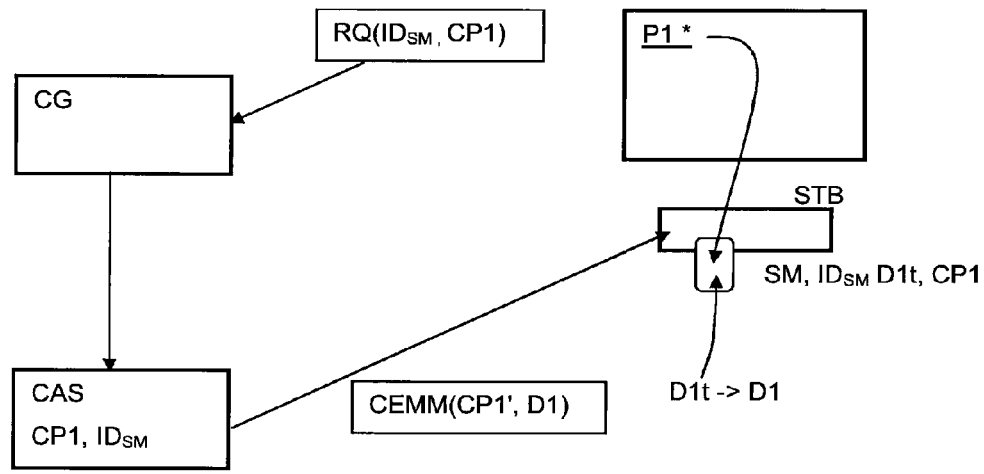
FIG. 1 shows a block-diagram of a system carrying out a first embodiment of the method wherein a request for an access right addressed to the managing center comprises a purchase code specific to a purchased product.

In the first embodiment of the method represented in FIG. 1, a product (P1) is selected by the user from a list displayed for instance on a television display. The purchase of the product enables a verification process of a credit stored in the security module (SM) associated with the user unit (STB) or decoder, this credit is expected to be equal or higher than the cost of the selected product (P1). In a further embodiment and particularly in case of simultaneous purchase of several products, the amounts of the corresponding costs can be memorized in a register of undertaken credits, the remaining credit being temporarily debited. This process corresponds to a provisional purchase of products, which will be validated later by the access control system (CAS).

A temporary right (D1t) is registered in the security module (SM) when the value amount of the product (P1) corresponds to a debit lower or equal to the credit remaining in the module (SM). A code (CP1) specific to the purchased product (P1) is either generated from the temporary right (D1t) or extracted from the description of the product (P1). According to a configuration example, this code can be memorized by the security module (SM) and associated with the temporary right (D1t) when the debit has been executed.

An application installed in the decoder (STB) allows the display of this code for the user, for instance on a television display or on a separated graphic display. To confirm the purchase, the user transmits this code (CP1) to the managing center (CG) with the identifier of its security module (IDSM).

A request message RQ(IDSM, CP1) is transmitted to a managing center (CG) via a communication channel, which is generally independent from the decoder (STB), for instance via the fixed or mobile telephone network, Internet or other transmission channel.

The request RQ(IDSM, CP1) can be transmitted either in a small message SMS, by a vocal server, by e-mail or on any other support agreed by the managing center (CG).

According to an embodiment, the decoder transmits the request to a mobile phone via a Bluetooth or infrared IrDA (Infrared Data Association) wireless connection. A short message (SMS) is then created from the received data, and transmitted to the managing center via the mobile network.

According to another example, the decoder is provided with a temporary connection with the managing center established only for the transmission of the request.

The managing center (CG) provides the access control system (CAS) with the request parameters. The access control system (CAS) first verifies the conformity of the identifier (IDSM) of the security module as well as of the product code (CP1). The positive result of the verification authorizes the generation of a confirmation message (CEMM) containing the identifier of the definitive right (D1).

The security module (SM) receives the message (CEMM) through the decoder (STB) and replaces the temporary right (D1t) with the definitive right (D1) if the temporary right (D1t) was actually stored in the security module (SM). Thus, the previous purchase made before is validated by authorizing the access to the product (P1).

For verification purpose, the confirmation message further comprises a product code (CP1') and the definitive right (D1) replaces the temporary right (D1t) only if the product code (CP1') corresponds with the product (P1) previously purchased. In the embodiment where the security module memorizes the product code (CP1), the code (CP1') returned by the confirmation message (CEMM) has to be identical to the stored code (CP1).

The security of the first embodiment of this method can be an object of an attack against the system consisting in repetitive transmission of requests RQ(IDSM, CP1) with valid security modules (SM) identifiers (IDSM) each accompanied by a valid product code (CP1). These requests may overload the access control system due to the sending of confirmation messages (CEMM), which will never be validated. Moreover, statistics and deduction of the consumed products intended to suppliers will be heavily skewed. In fact, the access control system (CAS) transmits a large number of unnecessary messages (CEMM) without necessarily authorizing an access to a product (P1). Although a valid security module identifier (IDSM), the definitive right (D1) can be invalid because it does not correspond with any temporary right (D1t) causing thus the rejection of the confirmation message (CEMM) by the unit (STB) receiving the definitive right (D1).

The shield against this attack consists in, on one hand to calculate by the security module (SM) the identifier (IDD1t) of the temporary right from the identifier (IDP1) of the purchased product (P1) and of the security module, and on the other hand, to encrypt this identifier of the temporary right (IDD1t) with a personal key (Kp) of the user unit (STB). The cryptogram thus obtained forms a purchase code (CAP1).

The right request RQ(IDSM, CAP1, IDP1) to the managing center (CG) comprises then the identifier of the security module (IDSM), the purchase code (CAP1) and the identifier of the purchased product (IDP1). On receipt of the request RQ(IDSM, CAP1, IDP1), the access control system (CAS) recalculates the purchase code (CAP1) knowing the personal key (Kp) of the user unit, the identifier of the product (IDP1) and the identifier of the security module (IDSM). In this way it can determine if the received purchase code (CAP1) is valid before preparing the confirmation message (CEMM) in reply to the request. In case of success of the comparison, the access control system (CAS) transmits the conditional message (CEMM) containing the definitive right (D1) authorizing the access to the product (P1) only to the unit (STB) identified by the identifier (IDSM) of the security module.

This embodiment of the method has the advantage to make the above described systematic attack more difficult because the purchase code (CAP1) depends on both the identifiers of the security module (IDSM) and of the product (IDP1) and not anymore on the identifier of the product only (IDP1) as in the first embodiment. Furthermore, the purchase code (CAP1) is encrypted with a secret personal key (Kp) of the security module (SM).

Figure 2:
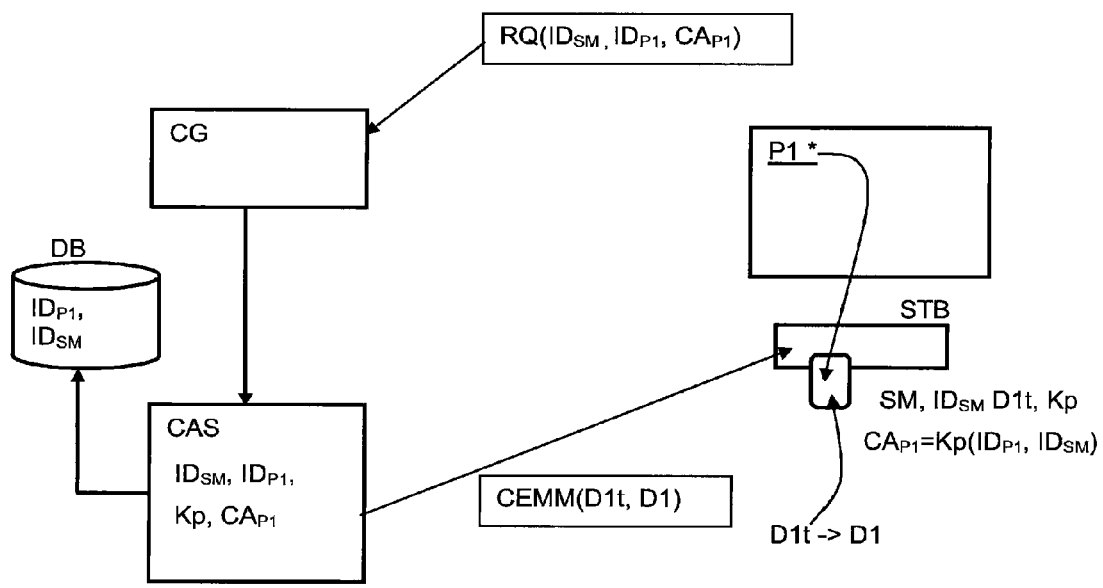
FIG. 2 shows a block-diagram of a system carrying out a second embodiment of the method wherein a request for an access right addressed to the managing center comprises a purchase code calculated from the identifiers of the security module and of the product.

This second embodiment shown on the FIG. 2 allows obtaining a higher security of the process by means of an enhanced purchase code (CAP1), which does not depend only on the purchased product (P1) but also on the security module (SM). In fact, the latter calculates this code (CAP1) from the identifiers of the product (IDP1) and from the identifier of the security module (IDSM) by encrypting them with a personal key (Kp) of the user unit (STB). The cryptogram Kp(IDP1, IDSM) or purchase code (CAP1) obtained is displayed on the available display means in order to be transmitted to the managing center (CG) by the communication channel. It should be noted that the personal key (Kp) can be either of the symmetrical type or asymmetrical type.

The managing center (CG) directs the request RQ(IDSM, CAP1, IDP1) towards the access control system (CAS) for verification of the conformity of the identifiers of the security module (IDSM) and of the product (IDP1) as well as of the purchase code (CAP1). The latter is recalculated by the access control system (CAS) and then compared with the one contained in the request.

When the validity of the contents of the cryptogram Kp(IDP1, IDSM) is confirmed, the access control system (CAS) generates a conditional confirmation message (CEMM) containing the definitive right (D1) and an identifier of the temporary right (D1t) as acceptance condition of the message.

This message (CEMM) is preferably encrypted by a personal key of said security module (SM). As in the first embodiment, the right (D1) of the confirmation message (CEMM) replaces the temporary right (D1t) when the temporary identifier is correct. This definitive right (D1) allows the access to the purchased product (P1).

When the message (CEMM) is not received by the user unit (STB) or is not transmitted by the managing center, the temporary right (D1t) expires either at the end of a predetermined period of no reception of the message after the creation of this right (D1t), or at the time of the broadcasting of the product (P1) having created this right (D1t). In this embodiment, the code of the product registered at purchase contains information about the broadcasting date and hour. At the expiration of the temporary right (D1t), the amount of the remaining credit of the security module is reset to the initial value preceding the purchase of the product (P1) thus allowing the security module to carry out a new access validation to a product.

When the verification does not succeed, the access control system (CAS) does not generate any message (CEMM). If the cryptogram Kp(IDP1, IDSM) is not correct, no message (CEMM) is sent and the temporary right (D1t) will last till its expiration. In both cases, the access to the "pre-purchased" product (P1) remains forbidden, due to the absence of a definitive right (D1) in the security module (SM).

The two embodiments allow the access control system (CAS) to store in a database (DB) respectively the identifiers (IDSM, IDP1) of the security module (SM) and of the purchased product (P1). This recording takes place preferably when the verification of the product code (CP1) respectively of the purchase code (CAP1) has been successful. It allows establishing a history, deductions and statistics of the products purchased by the user units in order to remunerate the products suppliers.

A simplified method consists in transmitting to the managing center information representative of the credit. Before a purchase, the user asks the user unit to generate a purchase code. This code is formed by the remaining credit and by the identifier of the security module. It can also be completed by a time value such as the date.

This code is transmitted by the user with the identifier of its security module and the one of the desired product. The access control system or the managing center extracts from the code the value of the credit on the basis of the received security module identifier. If the credit is sufficient relatively to the value of the product, a corresponding purchase message, containing the right and the value amount of the product, is sent to the security module. The security module verifies if the credit is actually sufficient for the desired product before memorizing the right and thus allowing the access to the product.

It should be noted that this simplified method is not safer than the first embodiment of FIG. 1 by being equally vulnerable to the attack consisting in saturating the access control system as described above.

The invention claimed is:

1. A method for validating access to a product, by a security module associated with a user unit unidirectionally connected to a managing center transmitting management messages addressed to said security module, said messages being generated by the managing center further to the receipt of a request for an access right to a product consisting in broadcasted digital data, said method comprising the following steps:
   purchasing by a user a product proposed by the user unit and verifying by the security module that a value amount associated with the product is covered by a remaining credit;
   registering a temporary right in the security module when the remaining credit is equal or higher than the value amount associated with said product;
   determining a code representing the purchased product;
   displaying said code on a display device connected to the user unit if the remaining credit is equal to or higher than the value amount associated with the product;
   reading by the user said code;
   building, by the user, a request by entering into a user interface of a transmission device at least said code and an identifier representing the identifier of the security module;
   transmitting by the transmission device, the request to the managing center, via a channel independent from the user unit;
   verifying by the managing, center the validity of the code and the identifier of the security module;
   generating and transmitting, by the managing center, a right confirmation message including a product code addressed to the user unit associated with said security module when the verification of the validity of the code and the identifier of the security module is successful;
   replacing, in the security module, said temporary right by a definitive right when the right confirmation message sent by the managing center is received by the user unit and when the product code corresponds to the purchased product, said definitive right authorizing the access to the purchased product by debiting the value amount associated with said product.

2. The method according to claim 1, wherein the product code corresponds to the code transmitted in the request addressed to the managing center.

3. The method according to claim 1, wherein the code is contained in a general management message related to the broadcasted product or to a product to be broadcasted.

4. The method according to claim 1, wherein the request is transmitted to the managing center either by phone in form of a short message or by means of a vocal server, by e-mail or any other channel supported by the managing center.

5. The method according to claim 1, wherein the code consists in a cryptogram, formed by an identifier of the purchased product and the identifier of the security module encrypted with a personal key of the user unit.

6. The method according to claim 5, wherein the request further comprises the identifier of the purchased product.

7. The method according to claim 6, wherein the managing center verifies the conformity of the code or the cryptogram and the conformity of the identifier of the security module and authorizes the sending of the confirmation message to said security module only if the verification is positive.

8. The method according to claim 7, wherein the managing center, on receipt of the request, recalculates the cryptogram from the identifiers of the security module and of the product and compares it with the cryptogram contained in the request, when the result of the comparison is positive, the managing center transmits a confirmation message containing a definitive right and an identifier of the temporary right as acceptance condition of said message.

9. A method for controlling access to a product, the method comprising the steps of:
- receiving by a user unit an indication that a user wishes to purchase a product;
- transmitting by the user unit a request to a security module for a verification that a user credit is sufficient to cover a cost of the product;
- establishing a temporary right in the security module if the user credit is sufficient to cover the cost of the product, the temporary right being specific to the product;
- receiving by the user unit the verification from the security module;
- displaying by the user unit, in response to receipt of the verification from the security module, a code corresponding to the temporary right to the user;
- receiving by the user unit a right confirmation message addressed to the user unit from a managing center, the right confirmation message including a definitive right and a code;
- transmitting by the user unit the right confirmation message to the security module;
- determining in the security module whether the code in the right confirmation message corresponds to the temporary right; and
- activating the definitive right in the security module to allow access to the product in response to the code in the right confirmation message corresponding to the temporary right.

10. The method of claim 9, wherein the code corresponding to the temporary right further depends on an identifier of the security module.

11. The method of claim 9, wherein the right confirmation message is specifically addressed to the user unit.

12. The method of claim 9, where in the right confirmation message is encrypted with a key particular to the user unit.

13. A security module comprising:
- a processor; and
- a memory connected to the processor;
- wherein the security module is configured to perform the steps of:
  - receiving a request from the user unit for a verification that a user credit is sufficient to cover a cost of a product;
  - storing a temporary right in the memory and sending a code associated with the temporary right to the user unit if the user credit is sufficient to cover the cost of the product, the temporary right being specific to the product;
  - receiving a right confirmation message originating from a managing center, the right confirmation message including a definitive right and a code;
  - determining in the security module whether the code in the right confirmation message corresponds to the temporary right; and
  - activating the definitive right in the security module to allow access to the product in response to the code in the right confirmation message corresponding to the temporary right.

14. The security module of claim 13, wherein the code corresponding to the temporary right further depends on an identifier of the security module.

* * * * *